D. P. SHARP.
HORSE-RAKE.
No. 174,016. Patented Feb. 22, 1876.
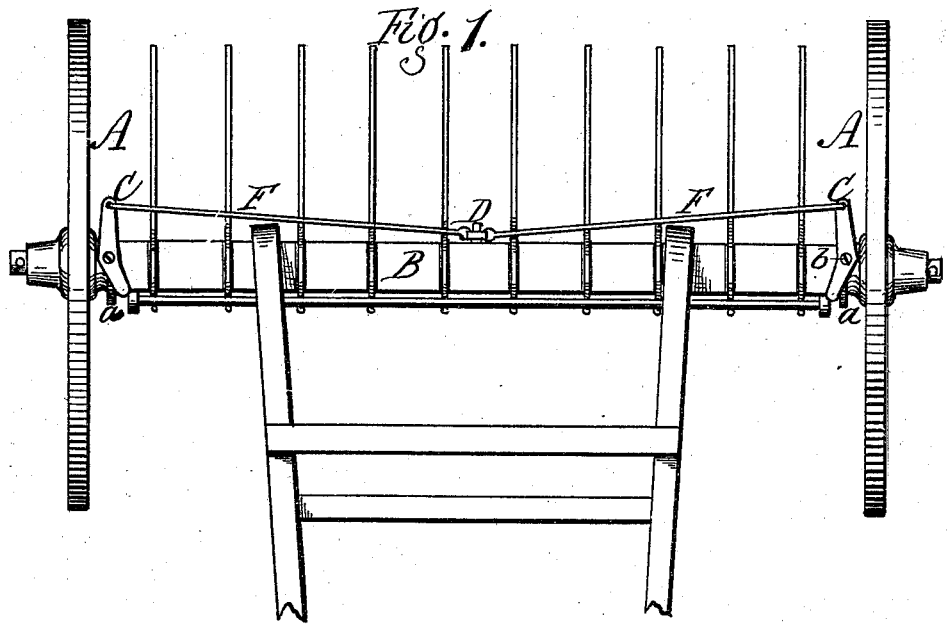
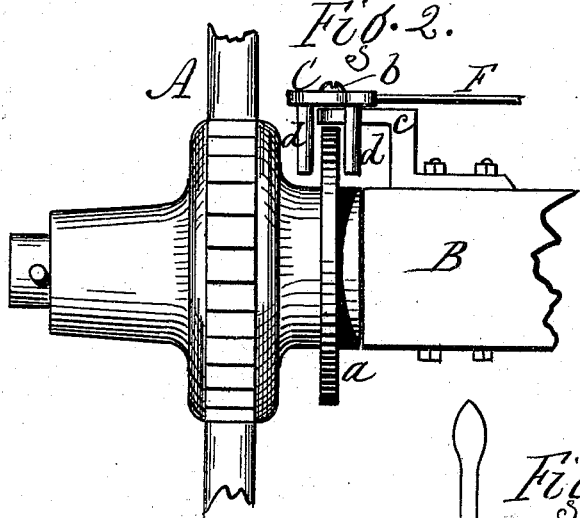
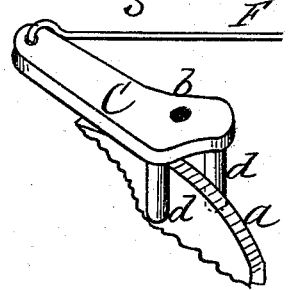
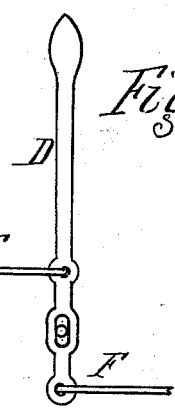
Witnesses.
E. B. Scott
N. Campbell
Inventor.
Dennis P. Sharp,
pr R. F. Osgood.
Atty.

UNITED STATES PATENT OFFICE.

DENNIS P. SHARP, OF ITHACA, NEW YORK.

IMPROVEMENT IN HORSE-RAKES.

Specification forming part of Letters Patent No. 174,016, dated February 22, 1876; application filed December 28, 1875.

*To all whom it may concern:*

Be it known that I, DENNIS P. SHARP, of Ithaca, in the county of Tompkins and State of New York, have invented a certain new and useful Improvement in Horse-Rakes; and I do hereby declare that the following is a full, clear, and exact description of the construction and operation of the same, reference being had to the accompanying drawings, in which—

Figure 1 is a plan of a rake showing my improvement. Fig. 2 is a rear elevation of one end; Figs. 3 and 4 are detail views showing, respectively, the rocker and lever.

My improvement belongs to that class of horse-rakes in which the teeth are raised to dump the load by the engagement of the axle with the wheels by a friction-brake, so that the axle turns with the wheels. Various devices for this purpose have been employed. One consists of a brake or shoe fitting to the periphery of the wheel; another consists of flexible straps encircling the hub; another of a friction-pad resting within a hollow flange of the hub; and still another consists of a pawl moved longitudinally upon the axle and engaging with ratchet-teeth of the hub.

My present invention consists of a pivoted rocker, provided with double pins, which embrace a circular flange or rim of the hub and produce a double friction by embracing the two opposite sides of the flange as the rocker is turned, as hereinafter described.

A A are the wheels, and B is the axle. The wheels fit loosely on the axle. The hub of each wheel, on the inner side, is provided with a circular flange or rim, $a$, which revolves with it. C is a rocker pivoted at $b$ to a bearing, $c$, attached fixedly to the axle. It is provided with two downwardly-projecting pins or lugs, $d\ d$, which embrace the flange $a$ on opposite sides, as clearly shown in Figs. 2 and 3. As the rocker C is turned, these two pins cramp or bind upon the opposite sides of the flange, and thereby engage the axle with the wheel so that it will be turned to dump the load as the wheel revolves. One of these rockers is used upon each end of the axle, engaging with the rims of the wheels, as above described.

F F are rods connecting the outer ends of the rockers C C with the single central lever D, by which the rockers are simultaneously operated. I prefer to connect the rods with the lever, as shown in Fig. 4, one above and one below the pivoted point; and the latter I arrange with a loose joint so that the lever may remain upright as the axle turns in dumping the load.

By the arrangement above described I produce a double frictional hold upon each wheel, which renders the engagement of the axle with the wheels much surer and more effective than where a single frictional contact only is produced. The power necessary to apply to produce the engagement is materially lessened. The engagement is very sensitive, both in applying and relieving; and no sudden shock is experienced, as where a ratchet and pawl are used. By applying the friction on both sides the power is balanced and there is no tendency to cramp the wheel against the shoulder of the axle. The device is simple, cheap, effective, and, standing downward, it is not liable to become clogged by hay. A similar result might be attained by making a groove in the hub and fitting therein an S-shaped rocker, which would bear at two opposite sides against the walls of the groove; but it would not be so effective in use as the device above described.

I do not claim, broadly, a friction-brake to connect the axle and wheels, as the same is not new; but

I claim—

In a horse-rake, the combination, with the flange $a$, of the rocker B, provided with the two pins or lugs, $d\ d$, embracing the flange and adapted to produce friction upon the two opposite sides of the same, in the manner and for the purpose specified.

In witness whereof, I have hereunto signed my name in the presence of two subscribing witnesses.

DENNIS P. SHARP.

Witnesses:
R. F. OSGOOD,
E. B. SCOTT.